US009098593B2

(12) United States Patent
Floyd et al.

(10) Patent No.: US 9,098,593 B2
(45) Date of Patent: Aug. 4, 2015

(54) BARCODE ACCESS TO ELECTRONIC RESOURCES FOR LIFECYCLE TRACKING OF COMPLEX SYSTEM PARTS

(71) Applicant: The Boeing Company, Seal Beach, CA (US)

(72) Inventors: Joseph F. Floyd, University Place, WA (US); Brent L. Hadley, Kent, WA (US); Patrick J. Eames, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/868,188

(22) Filed: Apr. 23, 2013

(65) Prior Publication Data
US 2014/0312114 A1    Oct. 23, 2014

(51) Int. Cl.
*G06F 17/30* (2006.01)

(52) U.S. Cl.
CPC ................. *G06F 17/30879* (2013.01)

(58) Field of Classification Search
CPC ............ G06F 17/30011; G06F 17/30879; G06F 17/30; G06K 19/06037; G06Q 30/06; G06Q 30/0601; G06Q 10/109
See application file for complete search history.

(56) References Cited

U.S. PATENT DOCUMENTS

| | | | |
|---|---|---|---|
| 5,341,466 A | 8/1994 | Perlin et al. | |
| RE36,145 E | 3/1999 | DeAguiar et al. | |
| 6,650,998 B1 | 11/2003 | Rutledge et al. | |
| 6,684,087 B1 | 1/2004 | Yu et al. | |
| 6,704,024 B2 | 3/2004 | Robotham et al. | |
| 6,766,331 B2 | 7/2004 | Shema et al. | |
| 7,200,271 B2 | 4/2007 | Boose et al. | |
| 7,246,328 B2 | 7/2007 | Boose et al. | |
| 7,365,747 B2 | 4/2008 | Finlayson et al. | |
| 7,783,644 B1 | 8/2010 | Petrou et al. | |
| 7,802,204 B2 | 9/2010 | Merry et al. | |
| 7,870,224 B1 | 1/2011 | Maigatter | |
| 7,872,650 B2 | 1/2011 | Fay | |
| 7,921,452 B2 | 4/2011 | Ridlon et al. | |
| 8,051,031 B2 | 11/2011 | Sims, III et al. | |

(Continued)

FOREIGN PATENT DOCUMENTS

| | | |
|---|---|---|
| EP | 1 176 520 A2 | 1/2002 |
| EP | 1 503 301 A2 | 2/2005 |

(Continued)

OTHER PUBLICATIONS

European Search Report dated Dec. 12, 2013 for European Application No. 13 184 084.5, 6 pages.

(Continued)

*Primary Examiner* — Sonji Johnson
(74) *Attorney, Agent, or Firm* — Womble Carlyle Sandridge & Rice LLP

(57) ABSTRACT

A method is provided that includes locating a barcode applied to a part of a complex system. The barcode may encode links to respective system-related resources for the part, which may include software-based systems and/or electronic documents. At one or more instances during a lifecycle of the part, then, the method may include scanning the barcode, and decoding the links from the barcode. The method may include displaying the links in a graphical user interface, and affecting navigation of at least one of the links through the graphical user interface to access a respective at least one of the system-related resources for the respective part.

18 Claims, 10 Drawing Sheets

(56) References Cited

U.S. PATENT DOCUMENTS

| | | | |
|---|---|---|---|
| 2002/0156692 A1* | 10/2002 | Squeglia et al. | 705/26 |
| 2003/0055871 A1 | 3/2003 | Roses | |
| 2003/0100964 A1 | 5/2003 | Kluge et al. | |
| 2003/0187823 A1 | 10/2003 | Ahl et al. | |
| 2004/0003097 A1 | 1/2004 | Willis et al. | |
| 2004/0028294 A1 | 2/2004 | Fukuda | |
| 2004/0093564 A1 | 5/2004 | Kumhyr et al. | |
| 2004/0223648 A1 | 11/2004 | Hoene et al. | |
| 2004/0267701 A1 | 12/2004 | Horvitz et al. | |
| 2005/0171661 A1 | 8/2005 | Abdel-Malek et al. | |
| 2005/0187838 A1 | 8/2005 | Squeglia et al. | |
| 2006/0161863 A1 | 7/2006 | Gallo | |
| 2007/0094615 A1 | 4/2007 | Endo et al. | |
| 2007/0226605 A1 | 9/2007 | Thomas | |
| 2008/0074423 A1 | 3/2008 | Gan et al. | |
| 2008/0111813 A1 | 5/2008 | Gatzke et al. | |
| 2008/0247636 A1 | 10/2008 | Davis et al. | |
| 2009/0086014 A1 | 4/2009 | Lea et al. | |
| 2009/0086199 A1 | 4/2009 | Troy et al. | |
| 2009/0112820 A1 | 4/2009 | Kessel et al. | |
| 2009/0138139 A1 | 5/2009 | Tsai et al. | |
| 2009/0317020 A1 | 12/2009 | Gerhard et al. | |
| 2010/0042361 A1 | 2/2010 | Hadley et al. | |
| 2010/0053069 A1 | 3/2010 | Tricoukes et al. | |
| 2010/0070759 A1 | 3/2010 | Leon Cobos et al. | |
| 2010/0102980 A1 | 4/2010 | Troy et al. | |
| 2010/0223269 A1 | 9/2010 | Shuf et al. | |
| 2010/0229115 A1 | 9/2010 | Augustine et al. | |
| 2010/0306696 A1 | 12/2010 | Groth et al. | |
| 2011/0087463 A1 | 4/2011 | Nakhle et al. | |
| 2011/0087513 A1 | 4/2011 | Floyd et al. | |
| 2011/0149266 A1 | 6/2011 | Motzer et al. | |
| 2011/0235858 A1 | 9/2011 | Hanson et al. | |
| 2012/0151515 A1 | 6/2012 | Atsmon et al. | |
| 2012/0188248 A1 | 7/2012 | Eames et al. | |
| 2012/0221625 A1 | 8/2012 | Troy et al. | |
| 2013/0032634 A1 | 2/2013 | McKirdy | |
| 2013/0071029 A1* | 3/2013 | Terwilliger et al. | 382/183 |
| 2014/0061297 A1* | 3/2014 | Smith et al. | 235/375 |
| 2014/0195031 A1* | 7/2014 | Couse et al. | 700/115 |
| 2014/0281855 A1* | 9/2014 | Bhatnagar | 715/205 |

FOREIGN PATENT DOCUMENTS

| | | |
|---|---|---|
| EP | 1 860 573 A1 | 11/2007 |
| EP | 2 482 538 A1 | 8/2012 |
| EP | 2 642 414 A2 | 9/2013 |
| WO | 2009005949 A1 | 1/2009 |

OTHER PUBLICATIONS

European Search Report dated Aug. 7, 2013 for European Application No. 13 160 361.5; 6 pages.
European Search Report dated Sep. 2, 2013 for European Application No. 13 160 848.1; 6 pages.
Rao et al., "Rich Interaction in the Digital Library," Apr. 1995, Communications of the ACM, Association for Computing Machinery, Inc., United States, vol. 38, No. 4, pp. 29-39.
European Search Report dated Feb. 10, 2014 for European Application No. 13 194 943.0, 6 pages.
About Deep Zoom Composer, 4 pages retrieved on Nov. 23, 2011 http://msdn.microsoft.com/en-us/library/dd409068(d-printer).aspx.
Airframe & Powerplant Mechanics General Handbook, US Department of Transportation Federal Aviation Administration, Chapter 2, pp. 35-52; Mar. 31, 1999.
Data differencing—Wikipedia, the free encyclopedia, 3 pages retrieved on Jul. 9, 2012 from http://en.wikipedia.org/w/index.php?title=Data_differencing&printable=yes.
"Deep Zoom" 4 pages retrieved on Apr. 18, 2012 http://en.wikipedia.org/wiki/DeepZoom.
European Search Report dated May 15, 2012 for EP Appln. No. 12152591.9, 13 pgs.
Extended European Search Report dated Mar. 6, 2013 for European Application No. 12198374.6, 7 pages.
Extended European Search Report dated Mar. 11, 2013 for European Application No. 12198679.8, 8 pages.
Extended European Search Report dated Mar. 19, 2013 for European Application No. 12195735.1, 7 pages.
"Futuristic software from Minority Report is real", 3 pages retrieved on Aug. 30, 2012 from http://www.foxnews.com/tech/2012/07/23/futuristic-software-from-minority-report-is-real/print.
"Hard Rock Memorabilia," 2 pages retrieved on Apr. 18, 2012 http://memorabilia.hardrock.com.
International Search Report mailed on Jan. 18, 2013 in PCT/US2012/058937.
International Search Report mailed on Dec. 21, 2012 in PCT/US2012/054808.
Li et al., "Automated Generation of Interactive 3D Exploded View Diagrams," copyright Aug. 2008, ACM Transactions on Graphics, vol. 27, No. 3, 7 pages.
Quintana et al., "Will Model-based Definition replace engineering drawings throughout the product lifecycle? A global perspective from aerospace industry," copyright 2010, Computers in Industry, vol. 61, pp. 497-508.
Tatzgern et al., "Multi-Perspective Compact Explosion Diagrams," copyright Feb. 2011, Computers & Graphics, vol. 35, No. 1, pp. 135-147.
"Theodolite Documentation/Help/FAQ" 6 pages retrieved on Dec. 14, 2012 http://hunter.pairsite.com/mobile/theodolite/help/index.html.
Written Opinion mailed on Jan. 18, 2013 in PCT/US2012/058937.
Written Opinion mailed on Dec. 21, 2012 in PCT/US2012/054808.
European Search Report dated Apr. 4, 2014 for European Application No. 14 152 644.2, 8 pages.
European Search Report dated Apr. 4, 2014 for European Application No. 14 152 646.7, 9 pages.
Cohn, "Back to Flat—Producing 2D Output from 3D Models," Autodesk University 2009, Dec. 11, 2009, pp. 1-14.
Li et al., "Automated Generation of Interactive 3D Exploded View Diagrams," ACM Transactions on Graphics, vol. 27, No. 3, Aug. 1, 2008, 7 pages.
Petre et al., "3D Model-based Semantic Labeling of 2D Objects," 2011 International Conference on Digital Image Computing: Techniques and Applications (DICTA), IEEE, Dec. 6, 2011, pp. 152-157.
Tatzgern et al., "Multi-perspective Compact Explosion Diagrams," Computers & Graphics, vol. 35, No. 1, Feb. 1, 2011, pp. 135-147.
Floyd et al., U.S. Appl. No. 13/868,179, filed Apr. 23, 2013, Office Action dated Mar. 10, 2014, 8 pages.
International Search Report for corresponding International Application No. PCT/US14/31278 mailed Nov. 3, 2014.

* cited by examiner

BARCODE ACCESS TO ELECTRONIC RESOURCES FOR LIFECYCLE TRACKING OF COMPLEX SYSTEM PARTS

TECHNOLOGICAL FIELD

The present disclosure relates generally to access to electronic resources such as software-based systems and documents and, in particular, to barcode access to system-related resources for complex-system parts.

BACKGROUND

In many companies that manufacture or use complex systems, electronic resources for those complex systems and their components, subsystems and parts (generally "elements" or "parts") may be spread over a number of locations, databases and the like. In the context of an aerospace company, for example, suitable resources may include documents such as engineering diagrams, technical drawings, wiring diagrams, and other suitable documents. These system-related resources are often used throughout manufacturing and service of a complex system. And the distributed manner by which resources are maintained often requires a searcher to extensively search across a number of hosts to locate desired resources for a specific complex system or part, which may be time consuming, inefficient and costly.

Moreover, system-related documents are often created to be viewed in printed form. However, such documents are commonly stored in electronic form and viewed on a display device of a data processing system. As a result, the reader looks through different documents that may be on different types of media. This type of review may be more time-consuming than desired to find information about a complex system or part.

System-related documents for a complex system such as an aircraft may contain large amounts of information regarding the complex system and its parts, and the connections and relationships among the respective parts. The complexity of the system and the large amount of information often required to describe the system may increase not only the time required to study the documents, but the difficulty in comprehending the complex system and its parts. A user may not only require the time to review documents containing large amounts of information, but may also require the time and endure the difficulty of studying the information to understand the ways in which the complex system and its parts relate to each other.

Product life cycle managers are confronted with how to manage and share large amounts of system-related documents for a complex system amongst their organization efficiently and consistently. The multiple independent systems currently used often inhibit knowledge capture and collaboration, and reduce opportunities to improve and transform product offerings. Needed are ways to access product-related design, production and maintenance information, while accommodating a business climate that is made of global teams, complex products, cross-functional processes, and expanded markets. Challenges remain to provide tools to access life cycle data and information, and facilitate easier communication amongst those working on or with a product.

Therefore, it may be desirable to have a method and apparatus that takes into account at least some of the issues discussed above, as well as possibly other issues.

BRIEF SUMMARY

Example implementations of the present invention are generally directed to a system, method and computer-readable storage medium for barcode access to electronic resources for lifecycle tracking of complex-system parts. Example implementations allow a user to access such system-related resources efficiently, inexpensively and without expending an unnecessarily large amount of time. Various system-related resources may be accessed throughout the lifecycle of a part, which may include pre-production, production or post-production of a complex system on which the part is installed for at least a period of time, as well as some time after removal of the part from the complex system. These system-related resources may include technical records such as maintenance records, repair records and the like, which may be accessed and updated throughout the lifecycle of the part. In the particular context of aircraft, this may facilitate compliance with FAA requirements such as its Aging Aircraft Safety Rule (AASR).

According to one aspect of example implementations, the method includes locating a barcode applied to a part of a complex system. The barcode may encode links to respective system-related resources for the part, which may include software-based systems and/or electronic documents. At one or more instances during a lifecycle of the part, then, the method may include scanning the barcode, and decoding the links from the barcode. The method may include displaying the links in a graphical user interface, and affecting navigation of at least one of the links through the graphical user interface to access a respective at least one of the system-related resources for the respective part.

In one example, the method further includes generating and applying the barcode to the part during pre-production, production or post-production of the complex system.

In one example, scanning the barcode, decoding the links, displaying the links and affecting navigation of at least one of the links occurs during production of the complex system. In this example, the system-related resources may include at least one of a design record, manufacturing record, receiving record, installation instructions and record, rework record or testing record.

In one example, scanning the barcode, decoding the links, displaying the links and affecting navigation of at least one of the links occurs during maintenance or service of the complex system. In this example, the system-related resources may include at least one of a maintenance record or repair record. And affecting navigation of at least one of the links may include affecting navigation of at least one of the links to access and enable an update to the at least one of the maintenance record or repair record consistent with maintenance and service activities performed on the complex system.

In one example, scanning the barcode, decoding the links, displaying the links and affecting navigation of at least one of the links occurs during maintenance or service of the complex system. In this example, the system-related resources may include at least one of an illustrated parts catalog, part information system, spare-part management system or part supplier system. And affecting navigation of at least one of the links may include affecting navigation of at least one of the links to enable determination of an availability of a replacement or spare part, or a suitable substitute part, for the part to which the barcode is applied.

In one example, displaying the links further includes displaying a user interface control through which an indication of removal of the part from the complex system on which the part is installed for at least some period of time. In this example, the user interface control may link to a software-based maintenance system through which one or more technical records for the part or complex system are updateable.

In one example, scanning the barcode, decoding the links, displaying the links and affecting navigation of at least one of the links occurs after removal from the part from the complex system on which the part is installed for at least some period of time. In this example, the system-related resources may include at least one of a maintenance record or repair record. And affecting navigation of at least one of the links may include affecting navigation of at least one of the links to access and enable an update to the at least one of the maintenance record or repair record consistent with maintenance and service activities performed on the complex system.

In other aspects of example implementations, a system and computer-readable storage medium are provided for barcode access to electronic resources for lifecycle tracking of complex-system parts. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
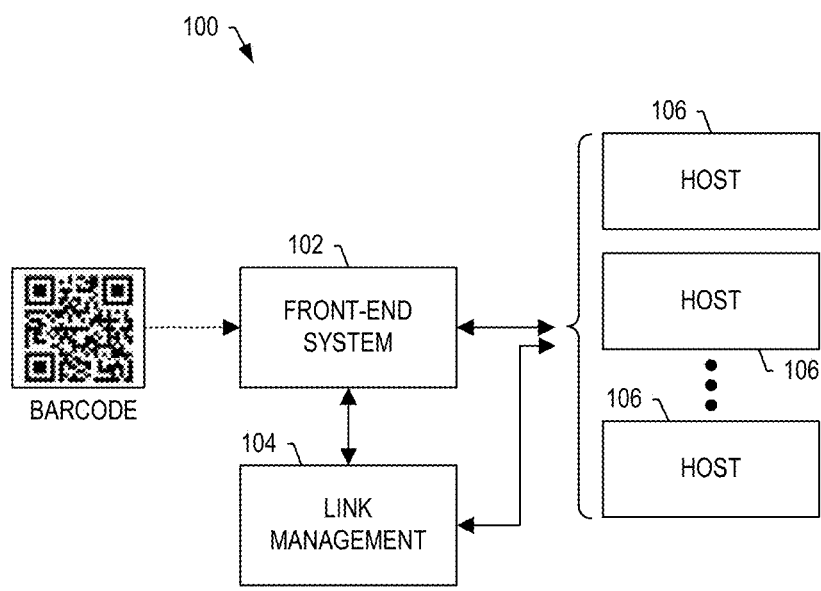
FIG. 1 is an illustration of a resource-access system in accordance with an example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present invention relate generally to barcode access to electronic resources for a complex system. More particularly, various example implementations relate to access to such electronic resources for the complex system from one or more resource hosts via one or more links provided by a barcode located on the complex system. Example implementations will be primarily described in conjunction with aerospace applications. It should be understood, however, that example implementations may be utilized in conjunction with a variety of other applications, both in the aerospace industry and outside of the aerospace industry. Access to electronic resources such as accurate parts information across industries is important because it can impact multiple aspects of equipment operations, including maintenance, materials-inventory management, purchasing and procurement, engineering support, logistics planning, shipping and receiving, and warehouse facilities management.

Referring now to FIG. 1, a resource-access system 100 is illustrated according to example implementations of the present disclosure. The system may include any of a number of different subsystems (each an individual system) for performing one or more functions or operations with respect to one or more electronic resources for a complex system such as an aircraft or any of a number of other physical structures. As shown, for example, the system may include a front-end system 102, link management system 104 and one or more resource host systems 106. In various examples in the context of an aircraft, the resource host systems may be provided or otherwise maintained by a system integrator, third party and/or operator (e.g., customer). A system integrator may include for example any number of aircraft manufacturers and major-system subcontractors; a third party may include for example any number of vendors, subcontractors and suppliers; and an operator may include for example an airline, leasing company, military entity, service organization or the like.

It should be understood that although the resource host system(s) 106 are shown separate from the front-end system 102 and link management system 104, in various examples, either or both the front-end system or link management system may include one or more resource host systems. It should also be understood that while the front-end system, link management system and resource host system(s) are shown as part of the resource-access system 100, one or more of the respective systems may instead be separate from but in communication with the resource-access system. Further, it should be understood that one or more of the subsystems may function or operate as a separate system without regard to others of the subsystems. And it should be understood that the resource-access system may include one or more additional or alternative subsystems than those shown in FIG. 1.

A complex system may be generally composed of one or more components, subsystems and the like (each generally referred to as a "subsystem"), with each subsystem being composed of one or more parts, and each part including one or more features. In this regard, the parts of the complex system may be assembled into a number of subsystems, which in turn may be assembled into the complex system. In the context of an aircraft, one or more parts or subsystems may be designed as a modular component of the aircraft often referred to as a line-replaceable unit (LRU), of which a single aircraft may include a number of LRUs and other parts or subsystems. Any of the complex system itself or any of its subsystems, parts (of subsystems), features (of parts) or the like may at times be generally referred to as an "element" or "part" of the complex system.

Again, electronic resources may include those for a complex system. These "system-related" resources may include, for example, software-based systems, electronic documents (or simply documents) and the like. Suitable software-based systems may include, for example, database management systems, resource-planning systems, production management systems, maintenance systems and the like, which in the context of an aircraft, may include TRAX, AMOS, SAP and the like. In another example, software-based systems may include part information systems, spare-part management systems (e.g., database management systems), part supplier systems and the like.

System-related documents may include design documents such as, for example, engineering diagrams, technical drawings (e.g., original equipment manufacturer—OEM—drawings), wiring diagrams and the like. These documents may also include maintenance documents and/or operations documents (either generally referred to as a "maintenance document"). Examples of suitable aircraft maintenance documents include an aircraft illustrated parts catalog (AIPC), aircraft flight manual (AFM), aircraft maintenance manual (AMM), aircraft recovery manual (ARM), airworthiness directive (AD), component maintenance manual (CMM), component maintenance manual parts list (CMMIPL), configuration change support data (CCSD), configuration deviation list (CDL), consumable products manual (CPM), engine (shop) manual (EM), engineering drawings (ED), equipment list (EL), dispatch deviation guide (DDG), engine cleaning inspection and repair manual (CIR), engine illustrated parts catalog (EIPC), engine parts configuration management section (EPCM), fault repair manual (FRM), fault reporting and fault isolation manual (FRM/FIM), flight crew operations manual (FCOM), general maintenance manual (GMM), illustrated tool and equipment manual (ITEM), in-service activity report (ISAR), maintenance planning document (MPD), maintenance review board report (MRB), maintenance synoptics, maintenance tips (MT), maintenance training manual (MTM), master minimum equipment list (MMEL), non-destructive testing manual (NDT), power plant build-up manual (PPBM), power plant build-up manual illustrated parts list (PPBMIPL), production management database (PMDB), service bulletin (SB), service bulletin index (SBI), service letter (SL), structural repair manual (SRM), systems description section (SDS), system schematics manual (SSM), task card, tool and equipment manual (TEM), weight and balance manual (WBM), wiring diagram manual (WDM) and the like.

In other examples, system-related documents may include technical records for respective units of a complex system or its parts, which may sometimes be generally referred to as serialized parts. These technical records may include design records, manufacturing records, receiving records, installation instructions and records, rework records, testing records, maintenance records, repair records and the like. These technical records may also include configuration records (e.g., videos, movies, photographs, models) for a complex system on which a serialized part is installed at the system's time of delivery.

In accordance with example implementations, barcode(s) may be located on or proximate or otherwise applied to (generally "on") complex-system part(s). For example, barcode(s) may be printed on respective part(s), or printed on substrate(s) that may be affixed to or proximate the respective part(s). The barcode may be any of a number of different machine-readable codes capable of carrying information. In various examples, the barcode may be a linear barcode, or a matrix (2D) barcode such as a QR Code® (Quick Response Code), data matrix code or the like. In one example, the barcode may be part of a label that includes the barcode, and possibly other visual information regarding the complex-system part such as one or more part identifiers (e.g., part name, part number, serial number), and/or coordinates of the part within the coordinate system of the complex system. The label, then, may be located on or proximate the part. For example, the label may be printed on the part or a substrate that may be affixed to or proximate the part.

Each barcode may include encoded (and possibly also encrypted) information regarding a complex-system part. The barcode-encoded information may include, for example, one or more links via which system-related resources for the part may be accessed. Examples of suitable links include uniform resource identifiers (URIs), uniform resource locators (URLs) and the like. A link may include a reference that points to one or more system-related resources, and may also include textual label that describes the respective system-related resource. In one example, the reference may be formatted as or to include a request to a respective resource host system 106 for system-related resource(s) for the respective complex-system part, which may vary in form depending on the resource host system. The link may generally point to one or more system-related resource(s) for a part, or may more specifically point (e.g., deep link) to a specific system-related resource. In addition to the barcode-encoded link(s), the barcode-encoded information may include other information regarding the part such as the part identifier, and/or coordinates of the part.

The front-end system 102 of the resource-access system 100 may be generally configured to read and the barcode located on a complex-system part, and decode links to respective system-related resources for the respective part from the barcode. In addition to these barcode-encoded link(s)—at times herein referred to as standard links, the front-end system and/or link management system 104 may be configured to provide one or more custom links to system-related resources for the respective part. The front-end system may be configured to generate and cause display of a portal document (at times be generally referred to as simply a portal) that identifies the respective part and includes standard and/or custom links to system-related resources. The system-related resources may be hosted by one or more resource host systems 106, and may be accessed via links provided by the portal.

Any of a number of different system-related resources and resource host systems 106 may be contemplated by example implementations of the present disclosure. Examples of suitable resource host systems may include those hosting software-based systems such as database management systems, resource-planning systems, production management systems, maintenance systems, part information systems, spare-part management systems, part supplier systems and the like.

As explained in greater detail below, one example of a suitable resource host system 106 may be a panoptic visualization document layout system configured to panoptically arrange system-related documents in a manner that reflects logical relationships between their content. This type of arrangement may enable a user to see the content in a single view, and in an arrangement that facilitates a better understanding of the relationships between the content, which may be otherwise difficult to comprehend. In the context of a complex system such as an aircraft including a number of components, subsystems and parts, the arrangement may not only lessen the time required to review documents containing large amounts of information, but may also lessen the time required and ease the difficulty studying the information to understand the ways in which the complex system and its parts relate to each other.

Another example of a suitable resource host system 106 is a document database system in which system-related documents may be stored in one or more databases, alone or along with other data. The document database system may be generally configured to create and manage database(s) of system-related documents. In one example, these system-related documents may include documents that may be panoptically arranged, such as by a suitable panoptic visualization document layout system.

Reference will now be made to FIGS. 2, 3, and 4 and 5, which illustrate more particular examples of a suitable front-end system, link management system and two resource host systems, respectively, according to example implementations of the present disclosure.

Figure 2:
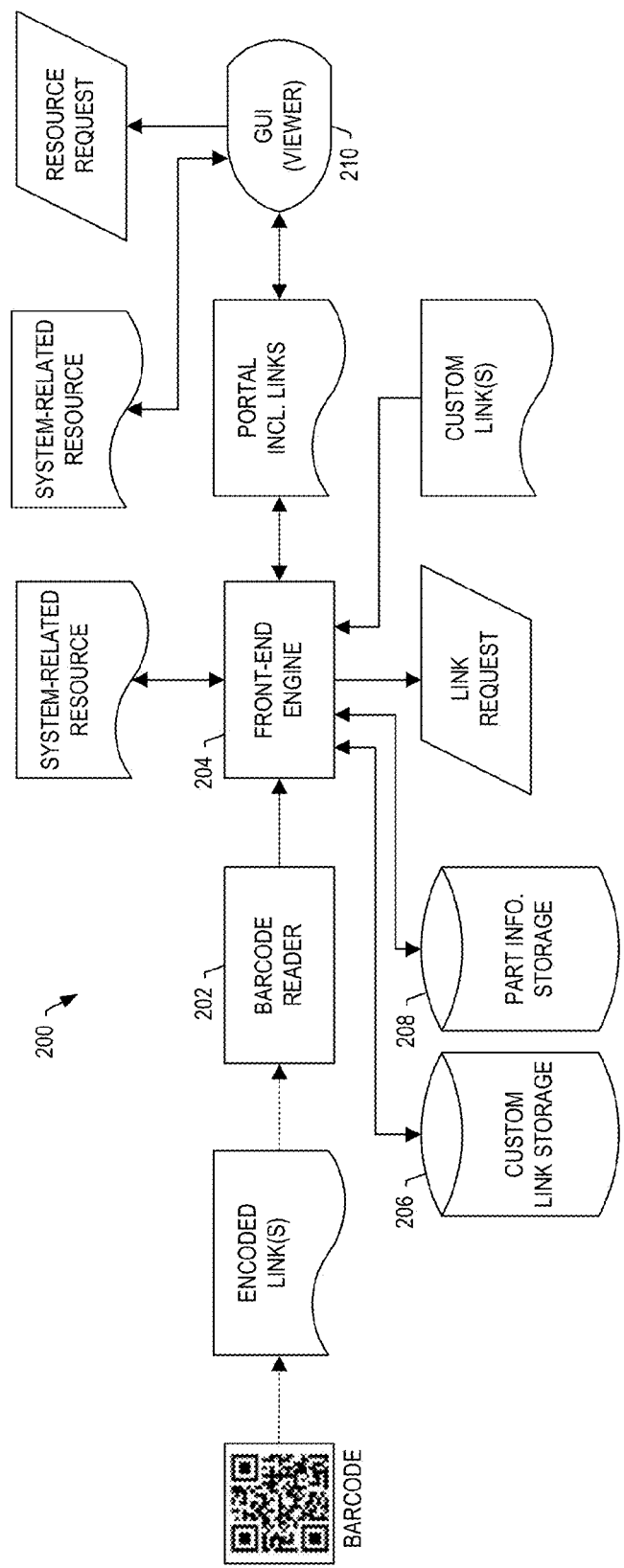
FIG. 2 is an illustration of a front-end system in accordance with an example implementation.

FIG. 2 illustrates a front-end system 200 according to one example implementation. As indicated above, the front-end system 200 may be one example of the front-end system 102 of the resource-access system 100 of FIG. 1. As shown in FIG. 2, the front-end system may include a barcode reader 202 (sometimes referred to as a barcode scanner) coupled to a front-end engine 204. The barcode reader may be configured to scan a barcode located on a complex-system part. The barcode reader may include any of a number of different types of readers or scanners capable of reading the barcode. Examples of suitable types of barcode readers include pen-type readers, laser scanners, CCD readers, camera-based readers, omni-directional barcode scanners, cell-phone cameras, smartphones and the like.

The barcode may encode information for the complex-system part, and the barcode reader 202 may include a decoder configured to decode the respective information. The front-end engine 204 coupled to the barcode reader may be configured to receive the information decoded by the barcode reader, and identify the complex-system part from the information, which may also include standard links to system-related resources for the part.

In some examples, the barcode reader 202 or front-end engine 204 may be configured to verify the barcode or at least some of the barcoded information, such as against a known layout or format of the barcode/barcoded information. This may reduce the likelihood of "attack tagging," or one otherwise affixing a face barcode over a legitimate, verifiable barcode.

In various examples, the barcode or at least some of the barcode-encoded information may be encrypted, such as in accordance with any of a number of different symmetric-key or public-key encryption techniques. In these examples, the barcode reader 202 or front-end engine 204 may be further configured to decrypt the barcode or barcode-encoded information, and may solicit an appropriate credential (e.g., personal identification number—PIN) from a user to enable the decryption.

In addition to or in lieu of standard links, the front-end engine 204 may retrieve other, custom links to system-related resources for the part on which the barcode is located. In various examples, the front-end engine may request one or more custom links from a link management system (e.g., link management system 104) to which the front-end system 200 may be coupled. In some examples, the request may identify the appropriate complex-system part, a user of the front-end system on whose behalf the links are being requested, and/or other information regarding the request. This other information may include, for example, a date and/or time at which the barcode reader 202 scanned the barcode, and/or a location of the front-end system at the respective date/time. The front-end system may in these examples include an appropriate calendar, clock and/or location-determination (e.g., GPS) modules.

In addition to or in lieu of custom links from a link management system, the front-end engine 204 may retrieve one or more custom links from a respective storage 206 resident or in communication with the front-end system. The custom links may be formatted and stored in any of a number of different manners, and hence, their storage may be of any of a number of different types. Examples of suitable types of storage include file storage, database storage, cloud storage and the like.

The front-end engine 204 may be configured to generate a portal that identifies the complex-system part on which the barcode is located, and includes standard links (decoded from the barcode) and/or custom links to system-related resources for the respective part. In one example, the front-end engine may generate the portal as a webpage including links in the form of hyperlinks to system-related resources.

The portal may identify the complex-system part in a number of different manners. For example, the portal may identify the part by part name, part number and/or serial number. The portal may also include other information for the complex-system part. For example, the portal may include coordinates of the part within the coordinate system of the complex system. The portal may include media content (e.g., diagrams, drawings, still images, videos) that depicts the part and/or its location within the complex system. The front-end engine 204 may even access and include a system-related resource directly in the portal, in lieu of a link to the respective resource. As suggested above, some of this information may be barcode-encoded along with standard links to system-related resources. In various examples, some of this information may be maintained in a respective storage 208 (e.g., file storage, database storage, cloud storage) resident or in communication with the front-end system.

The front-end engine 204 may be configured to cause display of the portal in a graphical user interface (GUI) 210 through which the standard and/or custom links are navigable to access respective system-related resources for the complex-system part. The GUI may be provided by the front-end engine or an appropriate viewer, which may be part of or otherwise in communication with the front-end system. In one example in which the portal is a webpage, the front-end engine may communicate the portal webpage to an appropriate web browser (viewer) configured to provide a suitable GUI within which the portal webpage may be displayed. As described herein, then, one or more functions described as being performed by or through the front-end engine or GUI may in various examples be more particularly performed by an appropriate viewer.

The portal may be displayed to a user who may navigate its links to respective system-related resources, which may be thereby retrievable through the GUI 210 for use by the user. For example, the viewer providing the GUI may receive selection of a link through the GUI, and communicate a request for a respective system-related resource to an appropriate resource host system (e.g., resource host system 106), which may return the requested resource back to the viewer for display by the GUI. The viewer or front-end engine 204 may coordinate user interaction with respective system-related resource. The viewer or front-end engine may not only affect the download (retrieval) of a system-related resource from a resource host system, but may affect the upload (insertion) of a system-related resource to a resource host system.

In various examples in which a system-related resource is access restricted, the front-end engine 204 may be configured to fully or partially automate authentication and authorization of the user to access the resource, such as based on pre-supplied a user credential. In this regard, the front-end engine may fully automate authentication and authorization without user intervention. Or the front-end engine may partially automate authentication and authorization, such as by soliciting and coordinating submission of the user credential to the resource host system). This may include in any of a number of different types of access to system-related resources at resource host systems, such as security-appliance (e.g., firewall) access, cut-through proxy, virtual private network (VPN) tunnel access or the like.

In some examples, a custom link to a system-related resource may be added or deleted through the front-end engine 204. Similarly, system-related resource may be added to or deleted from a resource host system (e.g., resource host system 106) through the front-end engine, which may result in an additional or broken custom link. For the addition of a system-related resource, the front-end system may request the addition of an appropriate custom link from the link management system (e.g., link management system 104), or add it to respective storage 206. For deletion of a system-related resource, the front-end engine 204 may request deletion of the broken custom link from the link management system, or delete it from respective storage. In other instances in which the addition or deletion of a system-related resource may be affected directly at a resource host system, the appropriate request to add a custom link or delete a broken custom link may be communicated from the respective resource host system to the front-end engine or link management system.

In some examples, it may be desirable to access a system-related resource via a custom link in lieu of a standard link to a similar system-related resource. In these examples, the custom link from the link management system (e.g., link management system 104) or respective storage 206 may be accompanied by an instruction to direct a user from a particular standard link to the respective custom link. The front-end engine 204 may replace the standard link with the respective custom link when generating the portal. Or the front-end engine may redirect a request to the standard link to the respective custom link instead.

As explained more generally below, an apparatus may be provided that is configured to function as or otherwise implement the front-end system 200 and its respective elements. The apparatus may comprise, include or be embodied in one or more fixed or portable, hardware-based electronic devices (e.g., smartphone, tablet computer). For example, the barcode reader 202 and front-end engine 204 of the front-end system 200 may be implemented by a hardware-based electronic device. The front-end system may be configured to communicate with a link management system (e.g., link management system 104), which in one example may be remote from the electronic device. The front-end engine may be configured to generate a portal including standard and/or custom links to system-related resources hosted by one or more resource host systems 106. In various examples, one or more custom links may be retrieved from the remote link management system, or respective storage 206 at the electronic device. And in one example, at least one of the resource host systems may also be implemented by the electronic device.

Figure 3:
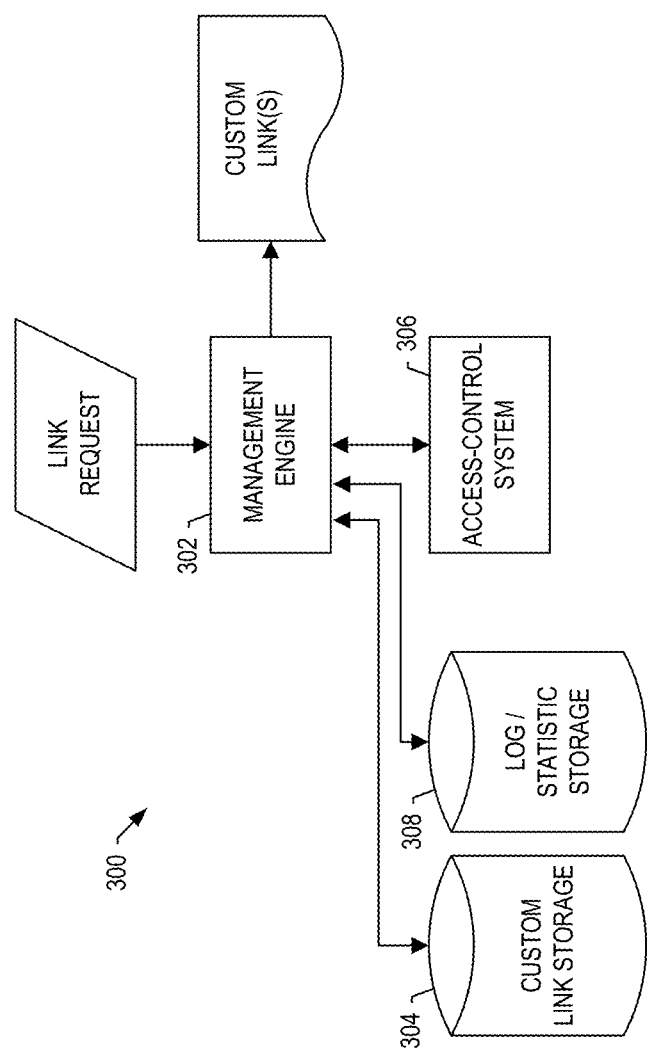
FIG. 3 is an illustration of a link management system in accordance with an example implementation.

FIG. 3 illustrates a link management system 300 according to one example implementation. The link management system 300 may be one example of the link management system 104 of the resource-access system 100 of FIG. 1. As shown in FIG. 3, the link management system 300 may include a management engine 302 configured to receive a request for one or more links to system-related resources for a complex-system part, and in response, provide the respective link(s). The links may be maintained in a respective storage 302 (e.g., file storage, database storage, cloud storage) resident or in communication with the link management system. And in various examples, the links may be custom links in addition to standard links for system-related resources for a respective part.

In various examples, one or more links to system-related resources may be access restricted. In these examples, the link management system 300 may include or be coupled to an access-control system 306 configured to define, enforce and/or administer access-control policies applicable to certain, restricted link(s). The access-control system may be configured to provide access control according to any of a number of different access-control models. Examples of suitable access-control models include discretionary access control (DAC), mandatory access control (MAC), lattice-based access control (LBAC), role-based access control (RBAC), attribute-based access control (ABAC), usage control (UCON), or any of a number of other models based thereon.

The access-control system 306 may be generally configured to enforce one or more access-control policies for one or more links. In one example, an access-control policy may be defined or otherwise generated for links by application of one or more entitlements or other rules that grant one or more users access to the link(s). An entitlement may generally grant access to a user requesting access to the link(s), which may be represented by an identity. An identity may define a user in any of a number of different manners. A user identity may include a unique identifier (e.g., username, email address) and credential (e.g., password, cryptographic key, security token). A user identity may also include one or more roles of the user. Additionally or alternatively, an identity may include one or more attributes of the user such as core attributes, context-specific attributes or the like. In these examples, an entitlement may directly grant access to the user based on their identifier/credentials, or directly grant access to the user based on their attribute(s) and/or role(s).

In the context of a system-related document for a complex system, for example, entitlements may grant access to link(s) on one or more bases such as organization, type of or individual complex system, complex-system part, maintenance task or the like. In this regard, a user affiliated with an organization may be restricted to only link(s) in which entitlements allow access to the respective organization, or perhaps to a type or individual complex system that may be associated with that particular organization. In another example, a user associated with complex-system part(s) with which the user is particularly knowledgeable may be restricted to only those link(s) depicting the respective part(s).

The access-control system 306 may be configured to receive requests and make decisions to grant or deny access to link(s) based on the policies. In one example, the access-control system may be coupled to the management engine 302 of the link management system 300, which may in turn be coupled to a front-end system such as the front-end system 102 of FIG. 1, from which the access-control system may receive a request to grant a user access to one or more links. The request may identify the requesting user, and/or complex-system part for which link(s) are being requested. In one example, the request itself may include the requesting user's identity, or enough of the identity (e.g., identifier/credentials) that any other necessary parts of the identity may be retrieved from an identity storage.

The access-control system 306 may retrieve one or more policies applicable to the requested link(s), and make a decision to grant or deny the user access to the link(s) based on the policies and user's identity. The access-control system may then communicate the access decision back to the management engine 302 to act on the decision. The management engine may provide a link-request response with links in an instance in which the user is granted access, or a link-request response without links in an instance in which the user is denied access. In one example in which the user is denied access to a link, the management engine may instead provide the textual label part of the link that describes a system-related resource, but without the reference that points to the respective resource. The response may be provided to the front-end system to include in a portal for the complex-system part. The portal may include links (label and reference) to system-related resources for which the user is granted access, and in one example, may include labels without respective references to system-related resources for which the user is denied access.

In various examples, the management engine 302 may receive a link request in each instance in which a barcode located on a complex-system part is scanned. The link request may include information regarding the request such as the date and/or time at which the front-end system scanned the barcode, and/or the location of the front-end system at the respective date/time. In these examples, the management engine may be configured to maintain a log or other appropriate statistics regarding scans of particular barcodes. One example of a suitable log may identify a complex-system part, and include the date/time and/or location for each instance of its barcode being scanned, and/or an identity of the user that scanned the barcode. This log and other statistics may be maintained in a respective storage 308 (e.g., file storage, database storage, cloud storage) resident or in communication with the link management system.

Figure 4:
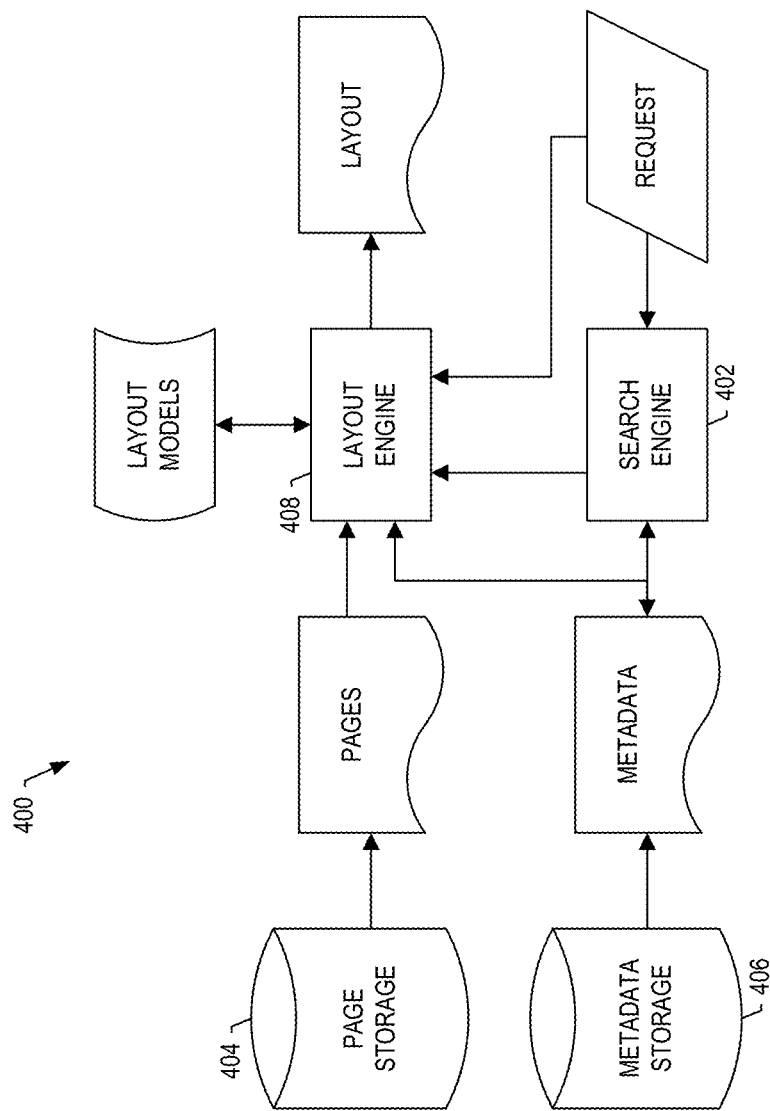
FIG. 4 is an illustration of a panoptic visualization document layout system that may correspond to a resource host system in accordance with an example implementation.

FIG. 4 illustrates a panoptic visualization document layout system 400 that in various example implementations may correspond to a host system 106. Similar to the resource-access system 100, the document layout system may include any of a number of different subsystems (each an individual system) for performing one or more functions or operations with respect to one or more documents. In this regard, a document such as a system-related document may be any electronic media content capable of being visualized in an electronic and/or printed (or printable) form. The media content of a document may include one or more of textual, graphical or other visual content such as still images, video or the like. A document may be composed of one or more constituent document components that may be groupings of its media content such as between basic breaking points. The document components may depend on the type of document and may include, for example, electronic pages, slides, diagrams, drawings, still images, videos or the like. The document component may at times be generally referred to as a "page," although the document component need not necessarily be an electronic page as it may include other types of components. In instances in which a document includes only one component, the document and its component may be one and the same.

Each page may be formed of data from which a visual representation of it (or rather its media content) may be generated in an electronic and/or printed (or printable) form. The visual representation of a page may at times be generally referred to as simply the page or as an "image," although the page need not necessarily include a still image as it may include other types of media content.

A page may include media content that has one or more subjects and includes one or more objects reflecting or otherwise forming the subject(s). At times, a page may therefore be said to depict its subject(s) and/or object(s) of its subject(s). As an example, a page may have an aircraft as its subject and include an exterior or interior view or sections of the exterior/interior view of the aircraft as object(s), or the page may have the exterior/interior view as its subject and include the sections of the exterior view as objects. As another example, a page may have an aircraft instrument panel as its subject and include gauges of the instrument panel as subjects.

A system-related document including system-related pages may generally include any of a number of documents that visually depict (e.g., graphically or textually) one or more complex-system parts. In some examples, this depiction may include one or more maintenance or operations tasks on or using such part(s) (either generally referred to as a "maintenance task") such as for operation, installation, maintenance, repair, removal, replacement or testing of complex-system part(s). A system-related document may be composed of one or more pages including media content, which again may include textual, graphical (e.g., drawings) or other visual content. In one example, the media content may include drawings and/or textual lists depicting one or more complex-system parts. In various examples, the media content may also include other information regarding the part(s).

For example, a page may include a drawing and/or textual list (media content) of a complex system (subject) including multiple subsystems (objects), a subsystem (subject) including multiple parts (objects), or a part (subject) including one or more features (objects). Additionally or alternatively, for example, a page may include a drawing and/or textual instructions (media content) of a maintenance task (subject) including multiple subtasks (objects), a subtask (subject) including multiple maintenance actions (objects), or a maintenance action (subject/object).

In various example implementations, documents including system-related documents and/or their pages may have one or more logical relationships between one another. In the context of a system-related document, for example, pages sharing a common system-related document may be logically related, or pages adjacent one another in order sequence in a common system-related document may be logically related. In other examples, the pages may be logically related according to one or more relationships between parts of the complex system depicted therein. These relationships may include, for example, spatial relationships, design relationships (e.g., work breakdown structure (WBS), system function, design family), functional relationships or the like.

For example, pages depicting the same part (partially or completely) may be logically related according to the spatial, design or functional relationship of depicting the same part. A page depicting the complex system may be logically related to pages depicting the complex system's subsystems, parts or features, according to spatial, design or functional relationships between the respective parts. In another example, a page depicting a subsystem may be logically related to pages depicting the subsystem's parts or features, according to spatial, design or functional relationships between the respective parts. And in yet another example, a page depicting a part may be logically related to pages depicting the part's features, according to spatial, design or functional relationships between the respective part and features.

In another example, a page depicting a part (partially or completely) may be logically related to a page depicting a maintenance task (partially or completely) performed on or using the respective part. Likewise, a page depicting a maintenance task (partially or completely) performed on or using a part may be logically related to a page depicting the respective part (partially or completely).

In yet another example, pages depicting the same maintenance task (partially or completely) may be logically related to one another. Pages depicting subtasks of the same maintenance task may be logically related to one another. Similarly, pages depicting actions of the same subtask may be logically related to one another. A page depicting a maintenance task may be logically related to pages depicting the task's subtasks or actions. And a page depicting a subtask may be logically related to pages depicting the subtask's actions.

The panoptic visualization document layout system 400 may be generally configured to generate a layout of panoptically-arranged, logically-related pages. The document layout system may include a search engine 402, request interface or the like configured to receive a request (e.g., resource request) for depiction of a complex-system part, such as a drawing that graphically depicts the part, a textual list that textually depicts the part and/or graphical or textual maintenance task(s) performed on or using the part. The search engine may identify one or more appropriate pages, which may be of a panoptic visualization document collection having a plurality of pages each of which includes respective media content and has associated metadata providing information about the respective page. This metadata may provide, for example, information about the type of document of which the page is a constituent, and/or information about media content of the page. The metadata may provide information identifying links that establish logical relationships between pages. The pages and metadata may be stored in respective storage 404, 406 (e.g., file storage, database storage, cloud storage).

The panoptic visualization document layout system 400 may also include a layout engine 408, layout generator or the like coupled to the search engine 402 and configured to select a layout model and generate a layout of pages including the identified page(s). In this regard, the layout engine may be configured to retrieve the identified page(s), and may also retrieve one or more other pages identified according to the associated metadata for the identified page, from respective storage 404. The layout engine may then generate a layout of the retrieved pages, panoptically-arranged according to the selected layout model, and the retrieved pages and their associated metadata. In addition to retrieving the pages, the layout engine of one example may also be configured to receive the associated metadata, such as from respective storage 406. The layout engine may then be configured to communicate the layout, such as to a GUI in which a layout may be displayed, or a printer for generating a printout of the layout. In one example, the layout engine may generate a website including the layout, which may be communicated to an appropriate viewer (e.g., web browser) configured to provide a suitable GUI (e.g., GUI 210) within which the respective website may be displayed.

In various examples, the layout may include at least some pages of two-dimensional (2D) derivatives of a three-dimensional (3D) representation (model) of a complex system, without any other pages not produced from such a 3D model. In other examples, the layout may include at least some pages of 2D derivatives of a 3D model of a complex system, and may also include one or more other pages not produced from such a 3D model. In these examples, the pages of 2D derivatives may include pages of 2D images depicting part(s) of the complex system, and may have associated metadata including information reflecting the 3D geometry of the respective part(s) within the coordinate system of the complex system. If any are included in the layout, the other page(s) may likewise depict complex-system part(s), but these other page(s) may have associated metadata absent information reflecting the 3D geometry of their respective part(s) within the coordinate system of the complex system.

In a more particular example, the standard and/or custom links of a portal generated by the front-end system 102 may include a link to pages (document components) of a panoptic visualization document collection. The collection may include a plurality of pages at least some of which depict complex-system parts. These and perhaps other pages may have associated metadata that, for each of at least some of the depicted complex-system parts, includes information reflecting a 3D geometry of the respective complex-system part within a complex-system coordinate system. The respective link of the portal may be navigable to a panoptic arrangement of the pages. The panoptically-arranged pages may include a particular page depicting the complex-system part on which the barcode is located, and one or more other pages identified according to the associated metadata for the particular page. This respective metadata may further include information identifying a link between the particular page and respective other page(s).

The panoptic visualization document layout system 400 of example implementations of the present invention may therefore provide an arrangement of pages in a layout according to logical relationships between the pages, which in one example in the context of a complex system such as an aircraft, may reflect spatial, design or functional relationships between its parts. The pages may be panoptically arranged in a manner that reflects the logical relationships, and in various examples, spatial, design or functional relationships. The arrangement may enable a user to see the pages in a single view, and in a manner that facilitates a better understanding of relationships that may be otherwise difficult to comprehend. In the context of a complex system for example, the arrangement may not only lessen the time required to review documents containing large amounts of information, but may also lessen the time required and ease the difficulty studying the information to understand the ways in which the complex system and its parts relate to each other.

For more information regarding a suitable panoptic visualization system 400, see U.S. patent application Ser. No. 13/751,937, entitled: Panoptic Visualization of Elements of a Complex System using a Model Viewer, U.S. patent application Ser. No. 13/751,994, entitled: Panoptic Visualization of Elements of a Complex System using Localization of a Point on a Physical Instance of the Complex System, and U.S. patent application Ser. No. 13/752,060, entitled: Panoptic Visualization of a Three-Dimensional Representation of a Complex System, all of which filed on Jan. 28, 2013. Additional information may also be found in U.S. patent application Ser. No. 13/414,987, entitled: Panoptic Visualization Document Layout, U.S. patent application Ser. No. 13/414,964, entitled: Panoptic Visualization Document Navigation, and U.S. patent application Ser. No. 13/414,940, entitled: Panoptic Visualization Document Collection, all of which filed on Mar. 8, 2012; as well as U.S. patent application Ser. No. 13/072,217, entitled: Image Management and Presentation, filed on Mar. 25, 2011. The contents of all of the aforementioned are incorporated herein by reference in their entireties.

Figure 5:
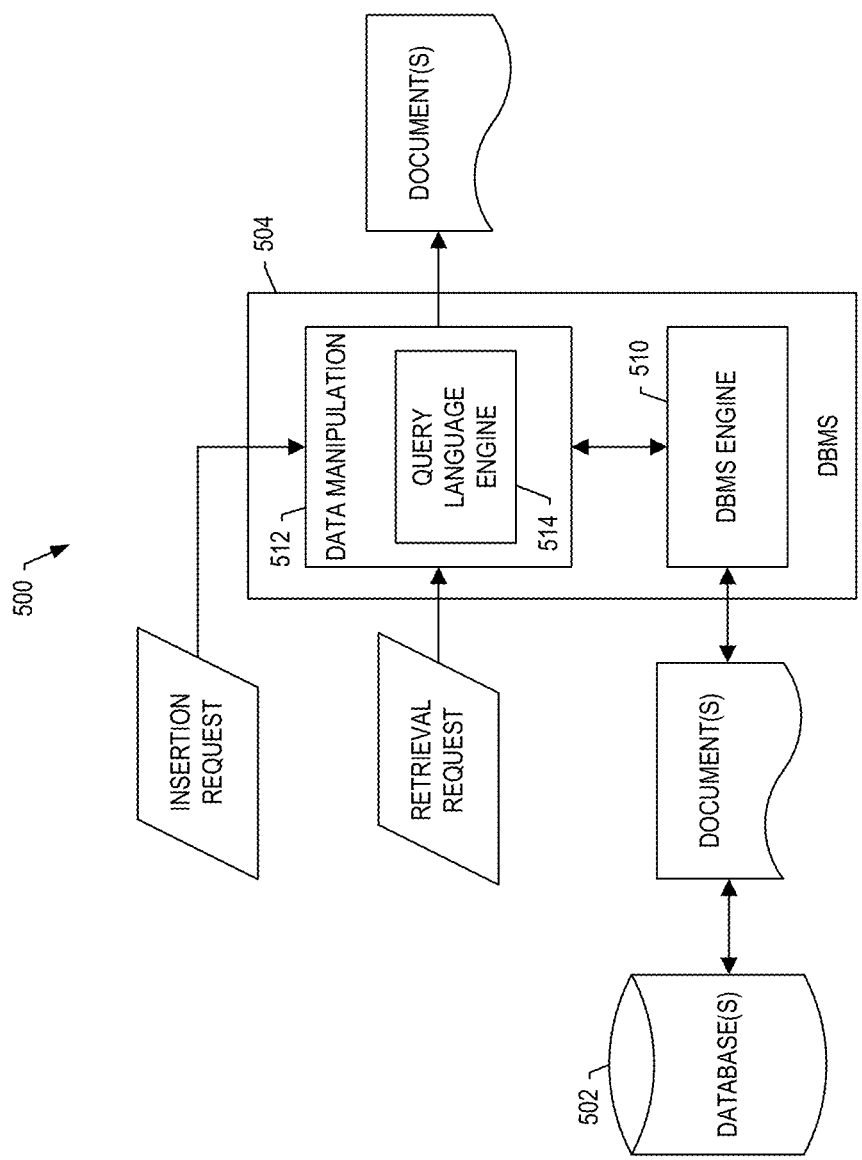
FIG. 5 is an illustration of a document database system that may correspond to a resource host system in accordance with an example implementation.

FIG. 5 illustrates a document database system 500 that in various example implementations may correspond to a host system 106. The document database system may be generally configured to create and manage database(s) of system-related documents (each of which may include one or more pages). As shown, the document database system may include one or more databases 502 and a database management system (DBMS) 504. The database may be structured according to any of a number of different data models, such as the relational data model in which case the database may be referred to as a relational database. The database may be configured to store system-related documents for complex-system parts, and in one example, may include a separate database of system-related documents for each of at least some of the parts. The documents may be stored in records (sometimes referred to as rows or tuples) of one or more tables (sometimes referred to as relations). The documents may be formatted as any of number of different data types in the database, such as numeric, date-and-time, string or the like. In one example, one or more of the documents may be stored as strings in the form of binary large objects (BLOBs).

The DBMS 504 may be generally configured to manage the database 502, and in one example in the context of a relational database, the DBMS may be referred to as a relational database management system (RDBMS). The DBMS may be configured to control the organization, storage and retrieval of data in the database. The DBMS may also be configured to control the security and integrity of the database.

The DBMS 504 may include any of a number of different subsystems (each an individual system) for performing one or more functions or operations with respect to the database 502. As shown, for example, the DBMS may include a DBMS engine 510 generally configured to manage data in the DBMS, and data manipulation subsystem 512 generally configured to control adding, changing and deleting data in the database, as well as querying the database for data.

The data manipulation subsystem 512 may include a query language engine 514 that alone or in combination with a data manipulation language (DML) engine, may be configured to receive queries or requests to add, change and/or delete data in the database 502, and/or query the database for data. This request may be in the form of one or more query language statements, and the query language engine may be configured to translate the query language statements to a format understandable by the DBMS engine 510. In one example, the query language engine may include a parser and query optimizer. The parser may be configured to separating or otherwise breaking down the query language statements into basic units of syntax, and may ensure that the statements follow a number of syntax rules. The query optimizer may be configured to examine the query language statements and determine the most efficient manner of their execution.

The DBMS engine 510 may be configured to execute the query language statements, such as in the manner determined by the query optimizer of the query language engine 514. In one example, the DBMS engine may include a transaction manager and file manager. The transaction manager may be configured to enforce permissions and resolve or otherwise prevent conflicts within the document database management system 500. The file manager may be configured to control input/output operations on the database 502, depending on the request.

In various instances, the query language engine 514 of the data manipulation subsystem 512 may receive a retrieval request for data from the database 502, such as a request for one or more system-related documents in the database. In one example, the request (e.g., resource request) may be for system-related document(s) for complex-system a part, such as a drawing that graphically depicts the part, a textual list that textually depicts the part and/or graphical or textual maintenance task(s) performed on or using the part. The DBS engine 510 may receive the request from the query language engine and execute the request. In one example, the file manager of the DBS engine may be invoked to retrieve the respective system-related document(s) from the database. The file manager may then be configured to pass the document(s) back to the query language engine. The query language engine may be configured to communicate the document(s), such as to a GUI in which the document(s) may be displayed, or a printer for generating a printout of the document(s).

In various other instances, the query language engine 514 of the data manipulation subsystem 512 may receive an insertion request to add data to the database 502. In one example, the query language engine may receive the insertion request from a front-end system 102 (e.g., front-end system 200). The request in this example may include a system-related document. The DBS engine 510 may receive the request from the query language engine, and through its file manager, may store the system-related document in the database 502. This or a similar process may also be implemented to change data in the database.

Figure 6:
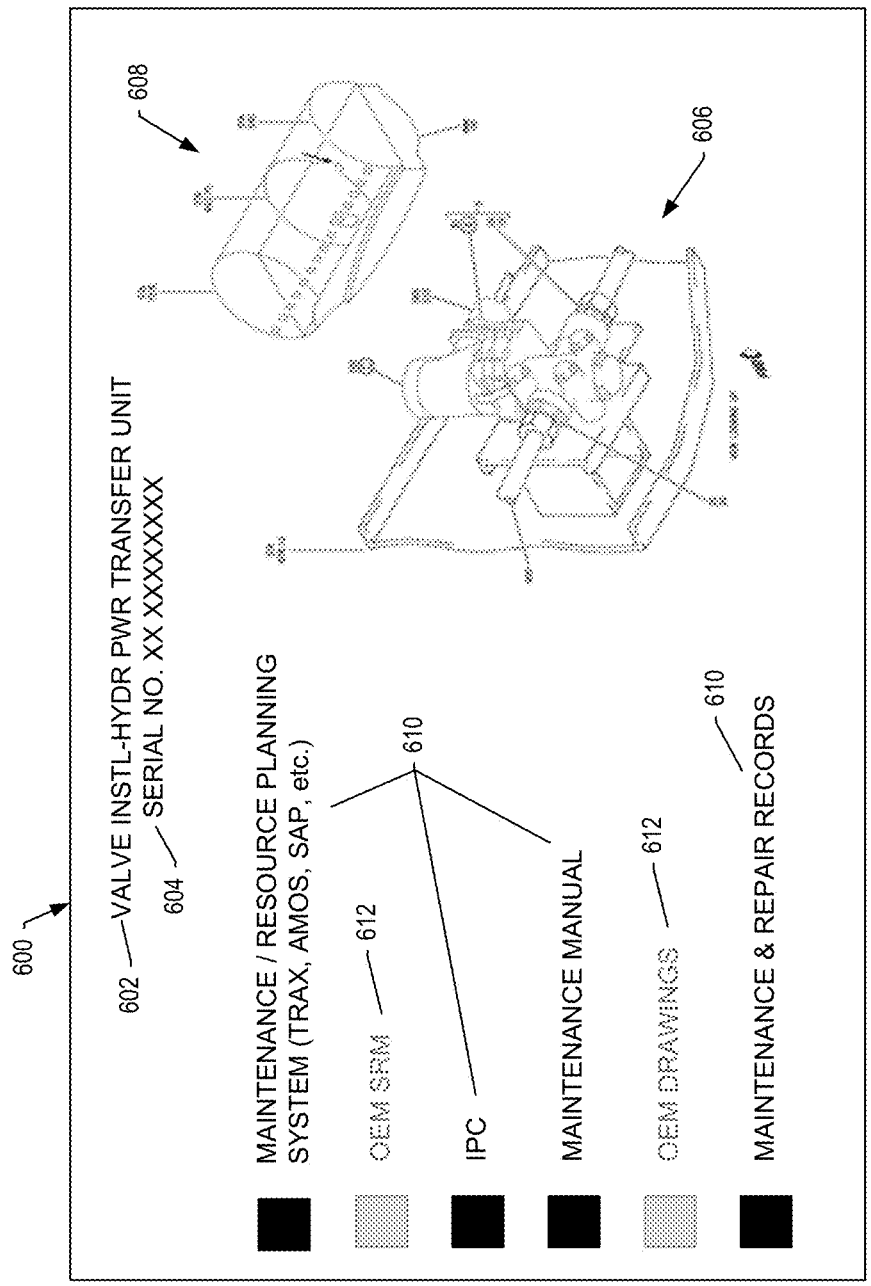
FIG. 6 and FIGS. 7-9 depict an example portal and layout of system-related pages that may be displayed, according to an example implementation of the present disclosure.

To further illustrate example implementation of the present disclosure, reference will now be made to FIG. 6 and FIGS. 7-9, which depict an example portal and layout of system-related pages that may be displayed in a GUI that has a predetermined viewable area, and which may be navigated by a user, according to an example implementation of the present disclosure. FIG. 6 illustrates a portal 600 for an aircraft part. The portal identifies the part by name 602 and serial number 604, and includes diagrams 606, 608 that depict the part and its location within the aircraft. The portal also includes links 610 (labels and references) to various system-related resources for the part. The links may include references to the system-related resources and visible textual labels that describe the respective resources. In this regard, the portal may also include textual labels 612 that describe other system-related resources, but without references to the respective resources. In various examples, these labels without references may reflect resources that do not exist or for which a user does not have an appropriate entitlement to access.

Figure 7:
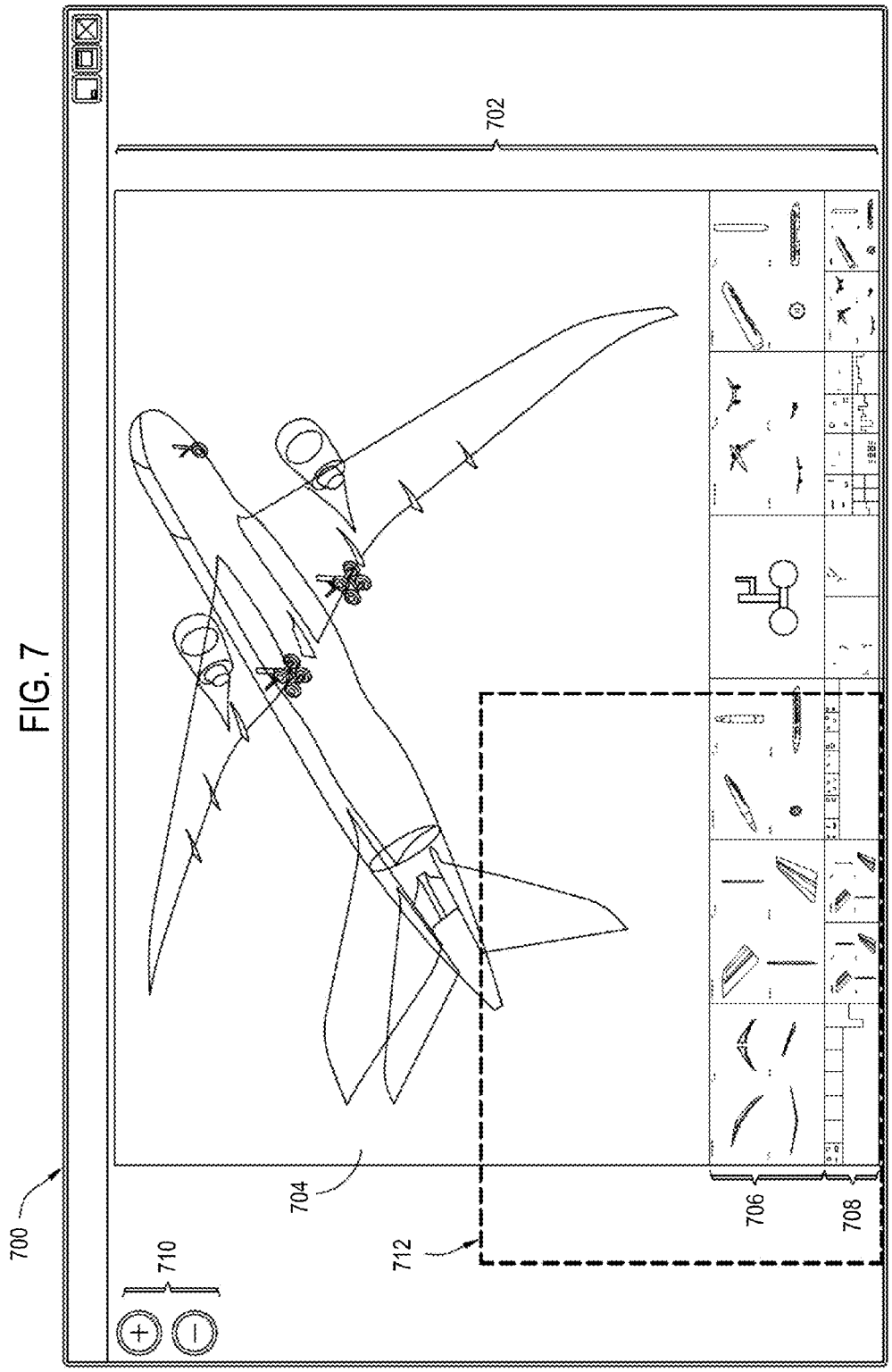
Figure 8:
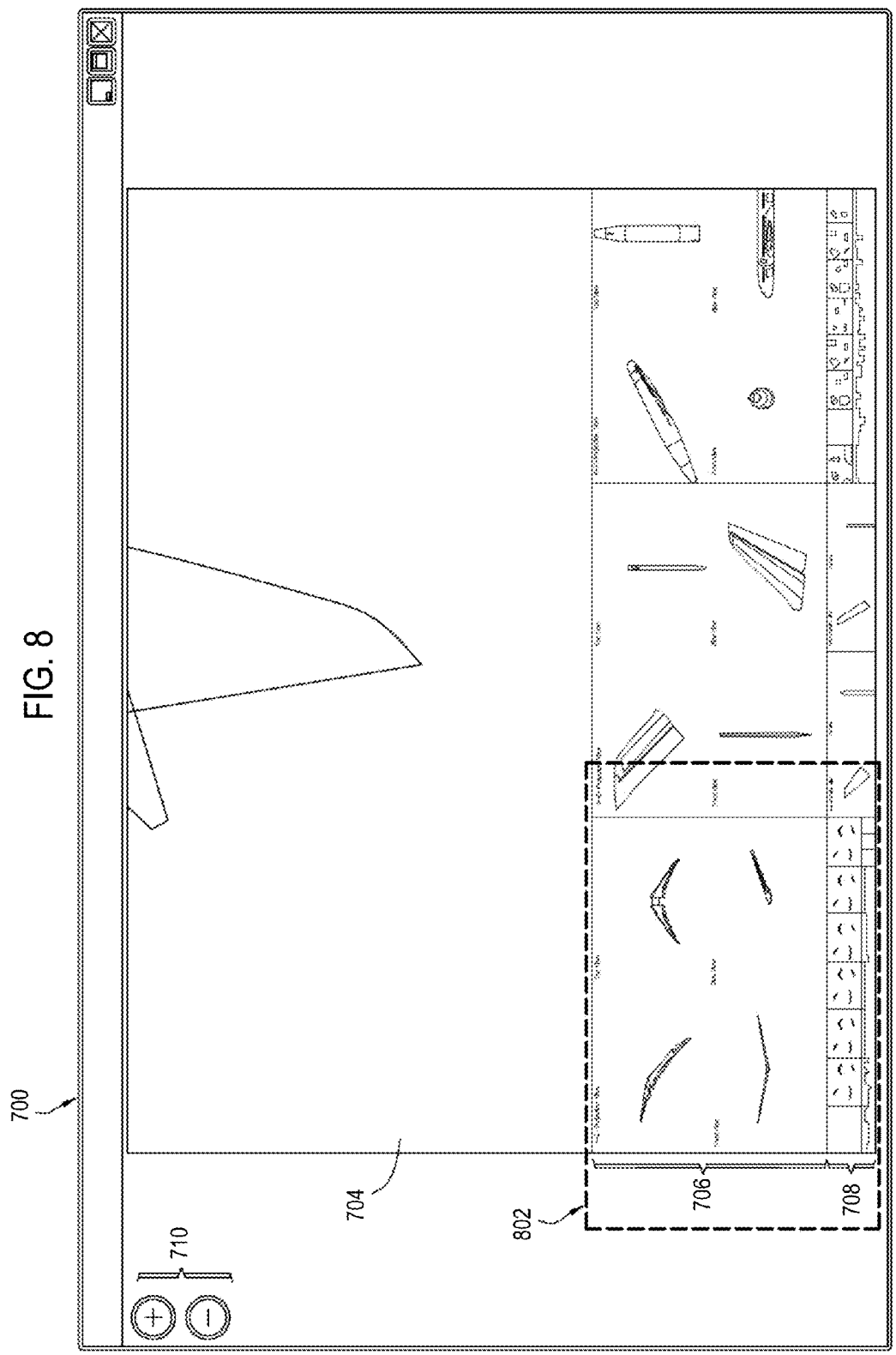
Figure 9:
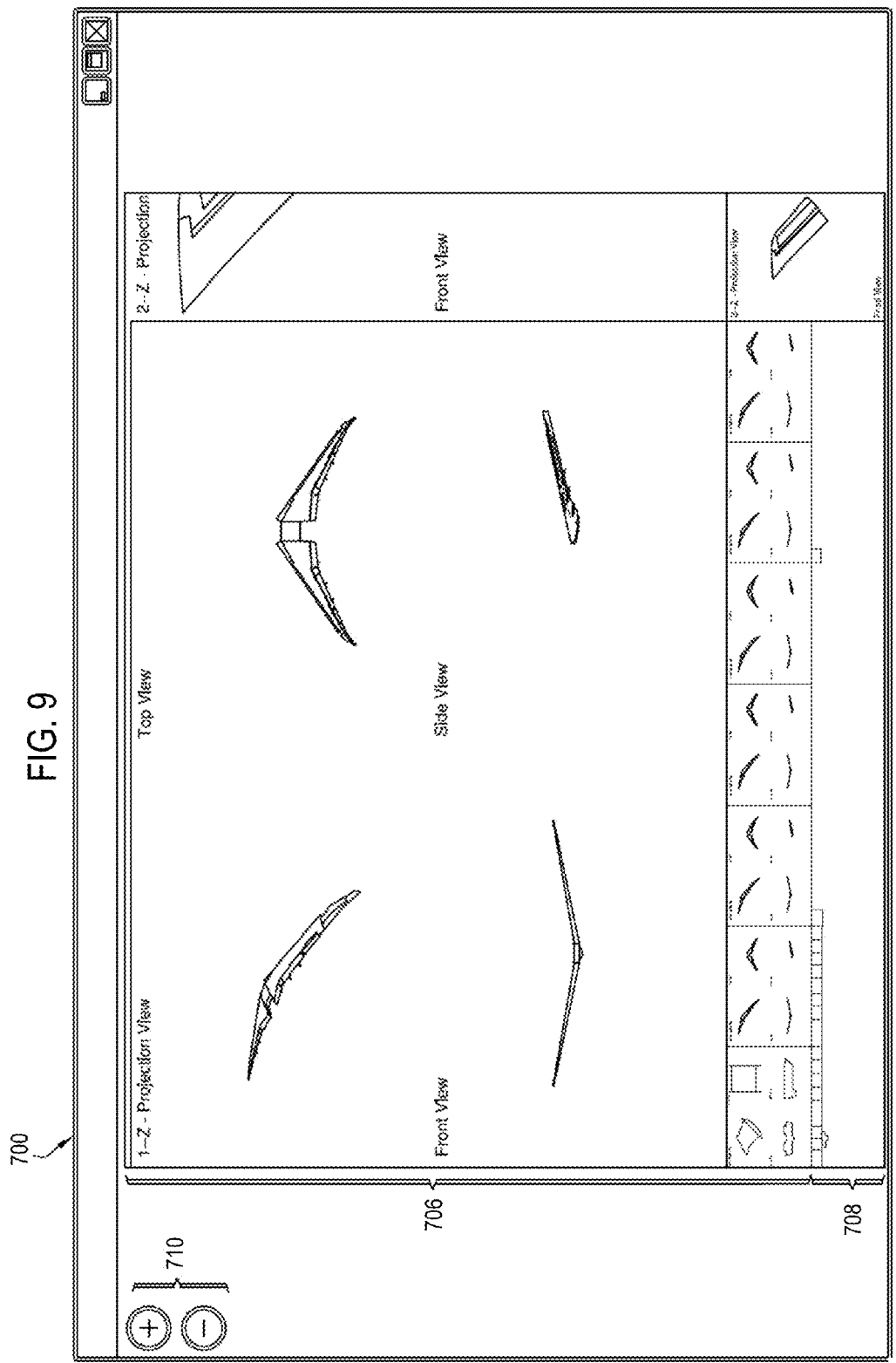

In accordance with example implementations, a user may navigate one of the links 610 in the portal 600 to access system-related related pages for the part, which in one example, may be panoptically arranged in a layout. FIGS. 7-9 illustrate an example of one suitable layout. More particularly, FIGS. 7-9 illustrate an example of a layout according to a hierarchy layout model displayed in a GUI that has a predetermined viewable area 700. As shown, a layout according to the hierarchy layout model may include a plurality of pages 702, each of which in one example may be a sub-image of the page at a respective resolution. Various ones of the pages may have different resolutions in the layout, with page 704 having a higher resolution than pages 706, which in turn have a higher resolution than pages 708, some of which again in turn have a higher resolution than others of which lower in the hierarchy.

The pages may be located and/or sized in the layout according to logical relationship(s) between the pages. In the example shown, the pages 702 are primarily from 2D derivatives of a 3D model of an aircraft but may also include one or more other pages not produced from the 3D model, and may have object-subject relationships. More particularly, for example, object(s) of a page on a level of the hierarchy may be subject(s) of pages below it in the hierarchy, the subject(s) in one example being additional detail regarding the object(s).

More particularly, for example, page 704 may depict a projection view of an exterior of the entire aircraft. Pages 706 may depict respective ones of a wing and wing box, tail, fuselage, landing gear, engine, and door assemblies. In the illustrated example, the pages 706 depicting the wing and wing box, tail, fuselage, engine, and door assemblies may be from 2D derivatives of the 3D model, while the page 706 depicting the landing gear may not be produced from the 3D model. Pages 708 may depict additional detail about the part(s) depicted by respective ones of pages 706. Each of pages 706 (except that of the landing gear), 708 may depict four views of a respective part, such as a projection view, front view, top view and side (left or right) view. In the viewable area 700, however, pages 708 (and perhaps even pages 706) may be presented at a resolution that causes their media content to be only partially understood or not understood at all by a user. Of course, in other example implementations, pages 708 may be presented at a sufficient resolution to interpret substantially all of their media content.

The GUI may present one or more selected navigation options for navigating the layout of pages 702. In this illustrative example, pan and zoom navigation options may be presented in the form of controls 710 to move and/or increase the size of the pages in the viewable area 700 to focus on a portion 712 of the layout. In other words, the user may activate the aforementioned controls to move and/or zoom the layout to fill a greater portion of the viewable area of the GUI with a portion of the layout. FIG. 8 illustrates one example of the result of navigating the layout in this manner.

As shown in FIG. 8, as the user activates controls 710 to focus on the portion 712 of the layout, the size of pages 704-708 may increase which, in one example, may include replacing sub-images of pages 704-706 with corresponding sub-images at higher resolutions. The resolution of the sub-images may allow the user to interpret substantially all of the presented media content. In this view, however, pages 708 may not be presented with sufficient resolution to be interpreted by the user, because the size of the respective pages may not have been increased to a level implicating a next sub-image. That is, even after having increased the size of the image, the size may still most closely approximate the same sub-image so as to not cause its replacement with the next sub-image at a higher resolution. In one example in which only a portion of page 704 is within the viewable area of the GUI, and in which the respective page is divided into tiles, only those tiles covering the viewable portion of the respective page may be retrieved and displayed.

In one example, the user may again activate controls 710 to move and/or resize the view to focus on an even smaller portion 802 of the layout, as shown for example in FIG. 9. Similar to before, as the user activates the controls 710 to focus on the portion 802 of the layout, the size of pages 704-708 may increase, which in one example, may now further include replacing a sub-image of page 708 with a corresponding sub-image at a higher resolution.

Figure 10:
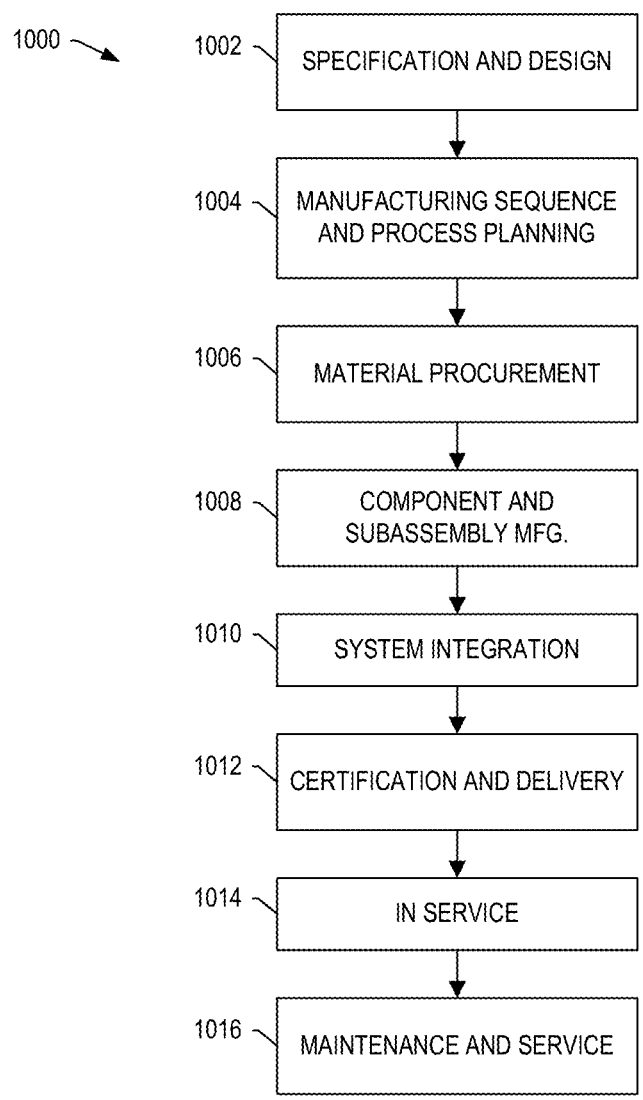
FIG. 10 is a flow diagram of an example aircraft production and service methodology, according to one example implementation.

Example implementations of the present disclosure may find use in a variety of potential applications, particularly in the transportation industry, including for example, aerospace, marine and automotive applications. One suitable application is in the context of supporting manufacturing, maintenance and service, and/or lifecycle tracking of a complex system such as an aircraft and its parts. Referring now to FIG. 10, example implementations may be used in the context of an aircraft manufacturing and service method 1000 including a number of processes each of which may be performed or carried out by a system integrator, third party and/or operator.

As shown in FIG. 10, during pre-production, the example method may include specification and design 1002 of the aircraft, manufacturing sequence and processing planning 1004 and material procurement 1006. During production, part manufacturing 1008 and system integration 1010 of the aircraft takes place. Thereafter, during post-production, the aircraft may go through certification and delivery 1012 in order to be placed in service 1014. At a number of instances while in service by a customer (also post-production), the aircraft may undergo maintenance (e.g., routine maintenance, line maintenance) or service 1016 (which may also include modification, reconfiguration, refurbishment or the like).

In various examples, the disclosed system and method may be utilized during any one or more of the processes of the example method. During pre-production (e.g., material procurement 1006), production (e.g., part manufacturing 1008, system integration 1010) and/or post-production (e.g., certification and delivery 1012, in service 1014, maintenance or service 1016), for example, barcodes including barcode-encoded links to system-related resources for respective aircraft parts may be generated and applied to the respective parts, alone or perhaps as part of a label. The system-related resources may include production management systems, and/or technical records such as design records, manufacturing records, receiving records, installation instructions and records, rework records, testing records and the like. The system-related resources may be hosted by one or more resource host system(s) 106 such as a panoptic visualization document layout system, document database system or the like. Any part may include one or more barcodes each of which may be generated and applied by a system integrator, third party or operator.

The system-related resources for various aircraft parts may be accessible from a front-end system 102, such as for consultation during production (e.g., part manufacturing 1008, system integration 1010) of the aircraft. In some examples, the front-end system may be implemented by a portable electronic device. At least some of the resource host system(s) 106 may be remotely-accessible from the front-end system, and in some examples, one or more of the resource host system(s) may be local, co-located with the front-end system, such as through the same portable electronic device implementation.

A barcode on a part may be located and scanned, and its links may be decoded and displayed in a GUI, such as in an appropriate portal. The links may include standard links, and perhaps other, custom links (local to the front-end system or retrieved from a link management system 104). Navigation of one or more of the links may then be affected through the GUI to access respective system-related resource(s) for the part. The system-related resources for various parts may be accessed, as desired or otherwise required, during production (part manufacturing 1008, system integration 1010), and/or post-production such as during certification and delivery 1012, while the aircraft is in service 1014, and/or during maintenance or service 1016 of the aircraft.

In one example, the disclosed system and method may be utilized during maintenance or service 1016 of the aircraft. In one example, the technical records for a part may include maintenance records, repair records and the like, which may be accessed and updated consistent with maintenance or service activities performed on the aircraft.

In various examples, the disclosed system and method may be utilized to access system-related resources to enable determination of an availability of a replacement or spare part, or suitable substitute part, which may expedite maintenance or service 1016 of the aircraft. In this example, the portal may include a standard or custom link to an AIPC, which may provide information regarding substitute(s) for a particular part. The portal may also include standard or custom links to systems such as part information systems, spare-part management systems, part supplier systems and the like. These systems may provide information regarding the availability of a replacement or spare part, or suitable substitute part.

As explained, system-related resources for various parts may be accessed through manufacturing and service 1000 of an aircraft. But in some examples, various system-related resources for a part may be accessed during and even after removal of the part from the aircraft on which the part is installed for at least some period of time. In one example, the portal for a serialized part generated by the front-end system may include one or more user-interface control through which an indication of removal of the part may be received, and which may link to an appropriate maintenance system through which one or more technical records for the part or aircraft are updateable.

Some system-related resources may more generally be accessible throughout the lifecycle of a part, which may include ownership and handling by a number of parties such as system integrators, third parties and/or operators. This may be particularly beneficial to access and enable an update to technical records for serialized parts, which may follow respective parts throughout their lifecycle. As indicated above, these records may include, for example, design records, manufacturing records, receiving records, installation instructions and records, rework records, testing records, maintenance records, repair records and the like. In one example, records such as maintenance records and/or repair records may be accessed and updated throughout the lifecycle of a part. In the particular context of aircraft, this may facilitate compliance with FAA requirements such as its Aging Aircraft Safety Rule (AASR).

The systems and methods embodied herein may therefore be employed during any one or more of the stages of the example production and service method 1000. For example, system implementations, method implementations or a combination thereof may be utilized during the production stages 1008 and 1010, and/or certification and delivery 1012. Similarly, for example, system implementations, method implementations or a combination thereof may be utilized while the aircraft is in service 1014 and/or during maintenance and service 1016. This may in turn substantially expedite assembly of or reduce the cost of an aircraft and/or its maintenance and service.

According to example implementations of the present disclosure, the resource-access system 100 and its subsystems including the front-end system 102, link management system 104 and/or resource host system(s) 106 may be implemented by various means. Similarly, the examples of a front-end system 200, link management system 300, panoptic visualization document layout system 400 (resource host system) and document database system 500 (resource host system), including each of their respective elements, may be implemented by various means according to example implementations. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementations of the present disclosure may comprise, include or be embodied in one or more fixed or portable, hardware-based electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

As explained above, example implementations of the present disclosure provide an efficient, inexpensive and time saving system and method for accessing system-related resources for a complex system and its parts. Example implementations may also provide a panoptic arrangement of various system-related documents, which may allow a user to simultaneously and quickly view and visually search a large number of pages. In instances in which a user may generally have an idea of the appearance of page(s) of interest, or have an idea of a logical relationship between the respective page(s) and other pages, a panoptic arrangement of pages may allow the user to locate and use page(s) of interest. The user may view pages as though they were laid out in the physical world without the physical space requirement involved with large collections of pages.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for access to electronic resources for lifecycle tracking of complex-system parts, the system comprising:
    a barcode scanner configured to scan a barcode applied to a part of a complex system, the barcode encoding a plurality of links to respective system-related resources for the part, the system-related resources including at least one of software-based systems or electronic documents, the barcode scanner being configured to decode the plurality of links from the barcode, wherein the plurality of links encoded by the barcode are standard links; and
    a front-end engine configured to retrieve other, custom links to system-related resources for the complex-system part, the custom links being distinct from the standard links encoded by the barcode, the front-end engine being configured to generate and cause display of a portal in a graphical user interface, the portal including the plurality of links decoded from the barcode, the portal identifying the complex-system part, and including both standard links and custom links, the front-end engine being configured to affect navigation of at least one of the plurality of links through the portal to access a respective at least one of the system-related resources for the respective part,
    wherein the portal further includes a user interface control through which an indication of removal of the part is receivable, the indication being of removal of the part from the complex system on which the part is installed for at least some period of time, the user interface control linking to a software-based maintenance system through which one or more technical records for the part are updateable, and
    wherein the barcode scanner is configured to scan the barcode and decode the plurality of links, and the front-end engine is configured to generate and cause display of the portal including the plurality of links, and affect navigation of at least one of the plurality of links, at one or more instances during a lifecycle of the part.

2. The system of claim 1, wherein the barcode scanner is configured to scan the barcode generated and applied to the part during pre-production, production or post-production of the complex system.

3. The system of claim 1, wherein the system-related resources include at least one of a design record, manufacturing record, receiving record, installation instructions and record, rework record or testing record, and
  wherein the barcode scanner is configured to scan the barcode and decode the plurality of links, and the front-end engine is configured to generate and cause display of the portal including the plurality of links, and affect navigation of at least one of the plurality of links, during production of the complex system.

4. The system of claim 1, wherein the system-related resources include at least one of a maintenance record or repair record,
  wherein the barcode scanner is configured to scan the barcode and decode the plurality of links, and the front-end engine is configured to generate and cause display of the portal including the plurality of links, and affect navigation of at least one of the plurality of links, during maintenance or service of the complex system, and
  wherein the front-end engine is configured to affect navigation of at least one of the plurality of links to access and enable an update to the at least one of the maintenance record or repair record consistent with maintenance and service activities performed on the complex system.

5. The system of claim 1, wherein the system-related resources include at least one of an illustrated parts catalog, part information system, spare-part management system or part supplier system,
  wherein the barcode scanner is configured to scan the barcode and decode the plurality of links, and the front-end engine is configured to generate and cause display of the portal including the plurality of links, and affect navigation of at least one of the plurality of links, during maintenance or service of the complex system, and
  wherein the front-end engine is configured to affect navigation of at least one of the plurality of links to enable determination of an availability of a replacement or spare part, or a suitable substitute part, for the part to which the barcode is applied.

6. The system of claim 1, wherein the system-related resources include at least one of a maintenance record or repair record for the part,
  wherein the barcode scanner is configured to scan the barcode and decode the plurality of links, and the front-end engine is configured to generate and cause display of the portal including the plurality of links, and affect navigation of at least one of the plurality of links, after removal of the part from the complex system on which the part is installed for at least some period of time, and
  wherein the front-end engine is configured to affect navigation of at least one of the plurality of links to access and enable an update to the at least one of the maintenance record or repair record consistent with maintenance and service activities performed on the part after removal of the part from the complex system.

7. A method comprising:
  locating a barcode applied to a part of a complex system, the barcode encoding a plurality of links to respective system-related resources for the part, the system-related resources including at least one of software-based systems or electronic documents; and at one or more instances during a lifecycle of the part,
  scanning the barcode, and decoding the plurality of links from the barcode, wherein the plurality of links encoded by the barcode are standard links;
  retrieving other, custom links to system-related resources for the complex-system part, the custom links being distinct from the standard links encoded by the barcode;
  generating and displaying a portal in a graphical user interface, the portal including the plurality of links decoded from the barcode, the portal identifying the complex-system part, and including both standard links and custom links; and
  affecting navigation of at least one of the plurality of links through the portal to access a respective at least one of the system-related resources for the respective part,
  wherein the portal further includes a user interface control through which an indication of removal of the part is receivable, the indication being of removal of the part from the complex system on which the part is installed for at least some period of time, the user interface control linking to a software-based maintenance system through which one or more technical records for the part are updateable.

8. The method of claim 7 further comprising:
  generating and applying the barcode to the part during pre-production, production or post-production of the complex system.

9. The method of claim 7, wherein the system-related resources include at least one of a design record, manufacturing record, receiving record, installation instructions and record, rework record or testing record, and
  wherein scanning the barcode, decoding the plurality of links, generating and displaying the portal including plurality of links, and affecting navigation of at least one of the plurality of links, occur during production of the complex system.

10. The method of claim 7, wherein the system-related resources include at least one of a maintenance record or repair record,
  wherein scanning the barcode, decoding the plurality of links, generating and displaying the portal including the plurality of links, and affecting navigation of at least one of the plurality of links, occur during maintenance or service of the complex system, and
  wherein affecting navigation of at least one of the plurality of links includes affecting navigation of at least one of the plurality of links to access and enable an update to the at least one of the maintenance record or repair record consistent with maintenance and service activities performed on the complex system.

11. The method of claim 7, wherein the system-related resources include at least one of an illustrated parts catalog, part information system, spare-part management system or part supplier system,
  wherein scanning the barcode, decoding the plurality of links, generating and displaying the portal including the plurality of links, and affecting navigation of at least one of the plurality of links, occur during maintenance or service of the complex system, and
  wherein affecting navigation of at least one of the plurality of links includes affecting navigation of at least one of the plurality of links to enable determination of an availability of a replacement or spare part, or a suitable substitute part, for the part to which the barcode is applied.

12. The method of claim 7, wherein the system-related resources include at least one of a maintenance record or repair record for the part,
  wherein scanning the barcode, decoding the plurality of links, generating and displaying the portal including the plurality of links, and affecting navigation of at least one of the plurality of links, occur after removal of the part from the complex system on which the part is installed for at least some period of time, and wherein affecting navigation of at least one of the plurality of links includes affecting navigation of at least one of the plurality of links to access and enable an update to the at least one of the maintenance record or repair record consistent with maintenance and service activities performed on the part after removal of the part from the complex system.

13. A computer-readable storage medium that is non-transitory and has computer-readable program code portions stored therein that, in response to execution by a processor, cause an apparatus to at least:

decode a plurality of links from a barcode applied to a part of a complex system, the barcode encoding the plurality of links to respective system-related resources for the part, the system-related resources including at least one of software-based systems or electronic documents, wherein the plurality of links encoded by the barcode are standard links;

retrieve other, custom links to system-related resources for the complex-system part, the custom links being distinct from the standard links encoded by the barcode;

generate and display a portal in a graphical user interface, the portal including the plurality of links decoded from the barcode, the portal identifying the complex-system part, and including both standard links and custom links; and affect navigation of at least one of the plurality of links through the portal to access a respective at least one of the system-related resources for the respective part, wherein the portal further includes a user interface control through which an indication of removal of the part is receivable, the indication being of removal of the part from the complex system on which the part is installed for at least some period of time, the user interface control linking to a software-based maintenance system through which one or more technical records for the part are updateable, and wherein the apparatus is caused to decode the plurality of links, generate and display the portal including the plurality of links, and affect navigation of at least one of the plurality of links, at one or more instances during a lifecycle of the part.

14. The computer-readable storage medium of claim 13, wherein the apparatus is caused to decode the plurality of links from the barcode generated and applied to the part during pre-production, production or post-production of the complex system.

15. The computer-readable storage medium of claim 13, wherein the system-related resources include at least one of a design record, manufacturing record, receiving record, installation instructions and record, rework record or testing record, and wherein the apparatus is caused to decode the plurality of links, generate and display the portal including the plurality of links and affect navigation of at least one of the plurality of links, during production of the complex system.

16. The computer-readable storage medium of claim 13, wherein the system-related resources include at least one of a maintenance record or repair record, wherein the apparatus is caused to decode the plurality of links, generate and display the portal including the plurality of links, and affect navigation of at least one of the plurality of links, during maintenance or service of the complex system, and wherein the apparatus is caused to affect navigation of at least one of the plurality of links to access and enable an update to the at least one of the maintenance record or repair record consistent with maintenance and service activities performed on the complex system.

17. The computer-readable storage medium of claim 13, wherein the system-related resources include at least one of an illustrated parts catalog, part information system, spare-part management system or part supplier system, wherein the apparatus is caused to decode the plurality of links, generate and display the portal including the plurality of links, and affect navigation of at least one of the plurality of links, during maintenance or service of the complex system, and wherein the apparatus is caused to affect navigation of at least one of the plurality of links to enable determination of an availability of a replacement or spare part, or a suitable substitute part, for the part to which the barcode is applied.

18. The computer-readable storage medium of claim 13, wherein the system-related resources include at least one of a maintenance record or repair record for the part, wherein the apparatus is caused to decode the plurality of links, generate and display the portal including the plurality of links, and affect navigation of at least one of the plurality of links, after removal of the part from the complex system on which the part is installed for at least some period of time, and wherein the apparatus is caused to affect navigation of at least one of the plurality of links to access and enable an update to the at least one of the maintenance record or repair record consistent with maintenance and service activities performed on the part after removal of the part from the complex system.

\* \* \* \* \*